US 8,839,713 B2

(12) United States Patent
Förster

(10) Patent No.: US 8,839,713 B2
(45) Date of Patent: Sep. 23, 2014

(54) SYSTEM FOR PASTEURIZING ANIMAL FOOD

(76) Inventor: Martin Förster, Engen (DE)

( * ) Notice: Subject to any disclaimer, the term of this patent is extended or adjusted under 35 U.S.C. 154(b) by 541 days.

(21) Appl. No.: 12/601,646

(22) PCT Filed: May 26, 2008

(86) PCT No.: PCT/EP2008/004173
§ 371 (c)(1),
(2), (4) Date: Feb. 15, 2010

(87) PCT Pub. No.: WO2008/141841
PCT Pub. Date: Nov. 27, 2008

(65) Prior Publication Data
US 2010/0173058 A1 Jul. 8, 2010

(30) Foreign Application Priority Data
May 24, 2007 (DE) .................. 10 2007 024 548

(51) Int. Cl.
| | |
|---|---|
| *A01J 11/00* | (2006.01) |
| *A23C 1/00* | (2006.01) |
| *A23C 3/02* | (2006.01) |
| *A23C 3/04* | (2006.01) |
| *A23C 15/04* | (2006.01) |
| *A47J 31/44* | (2006.01) |
| *A23L 3/22* | (2006.01) |
| *F28D 7/02* | (2006.01) |
| *A23L 3/16* | (2006.01) |
| *A23L 3/365* | (2006.01) |
| *A01J 25/00* | (2006.01) |
| *A23K 1/18* | (2006.01) |
| *A23C 3/03* | (2006.01) |
| *A23K 1/00* | (2006.01) |

(52) U.S. Cl.
CPC ............. *F28D 7/024* (2013.01); *A47J 31/4485* (2013.01); *A23L 3/22* (2013.01); *A23L 3/16* (2013.01); *A23L 3/365* (2013.01); *A01J 25/008* (2013.01); *A23K 1/1893* (2013.01); *A23C 3/031* (2013.01); *A23K 1/00* (2013.01)
USPC ..................... 99/455; 99/452; 99/453; 99/483

(58) Field of Classification Search
CPC ............. A23L 3/005; A23L 3/22; A23L 3/04; A23L 3/365; A47J 31/4485; A01J 25/112; A01J 25/008; A21B 7/005; A23C 3/037; A23C 3/033; A23C 13/12; A23B 4/08
USPC ........... 99/451, 452, 453, 454, 455, 470, 483, 99/348; 426/474, 519, 521, 522, 524
See application file for complete search history.

(56) References Cited

U.S. PATENT DOCUMENTS 612,106 A * 10/1898 Hill ................................. 165/90
2,052,396 A * 8/1936 Getchell ......................... 99/453
(Continued)

FOREIGN PATENT DOCUMENTS

| DE | 10328518 | 10/2004 |
|---|---|---|
| DE | 102005030924 | 8/2006 |

(Continued)

*Primary Examiner* — Henry Yuen
*Assistant Examiner* — Hemant Mathew
(74) *Attorney, Agent, or Firm* — Bachman & LaPointe, P.C.

(57) ABSTRACT

A system for pasteurizing animal food, comprising a pasteurizing unit and a cooling unit designed as a heat exchanger (3 or 3') is disclosed. The height (H) of the heat exchanger (3 or 3') is a multiple of the maximum width (D) thereof. A pipe is provided inside the heat exchanger (3 or 3') as a cooling serpentine (6) which extends nearly along the entire height (H) of the heat exchanger (3 or 3').

13 Claims, 2 Drawing Sheets

(56) References Cited

U.S. PATENT DOCUMENTS

| | | | |
|---|---|---|---|
| 2,076,372 A * | 4/1937 | Hunter | 426/519 |
| 2,569,958 A * | 10/1951 | Struve et al. | 220/573.4 |
| 2,738,170 A * | 3/1956 | Zamboni | 165/64 |
| 4,479,423 A * | 10/1984 | Schwitters et al. | 99/455 |
| 5,771,336 A * | 6/1998 | Polny, Jr. | 392/321 |
| 6,189,440 B1 * | 2/2001 | Amundson | 99/455 |
| 6,276,264 B1 * | 8/2001 | Dumm | 99/455 |
| 7,401,546 B2 * | 7/2008 | Dumm | 99/470 |
| 2004/0187707 A1 * | 9/2004 | Nielsen et al. | 99/453 |
| 2005/0103213 A1 * | 5/2005 | Dumm | 99/483 |

FOREIGN PATENT DOCUMENTS

| | | |
|---|---|---|
| EP | 0604308 | 6/1994 |
| EP | 1494960 | 1/2005 |
| EP | 1610618 | 1/2006 |
| EP | 1613167 | 1/2006 |

\* cited by examiner

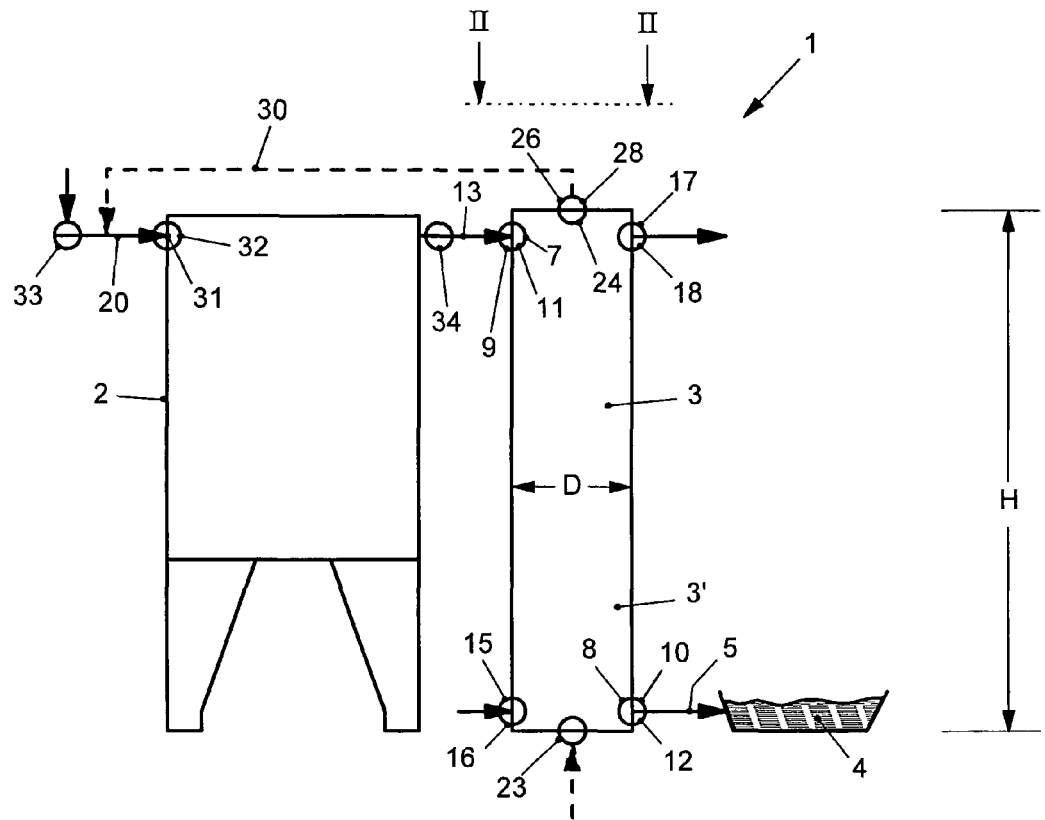
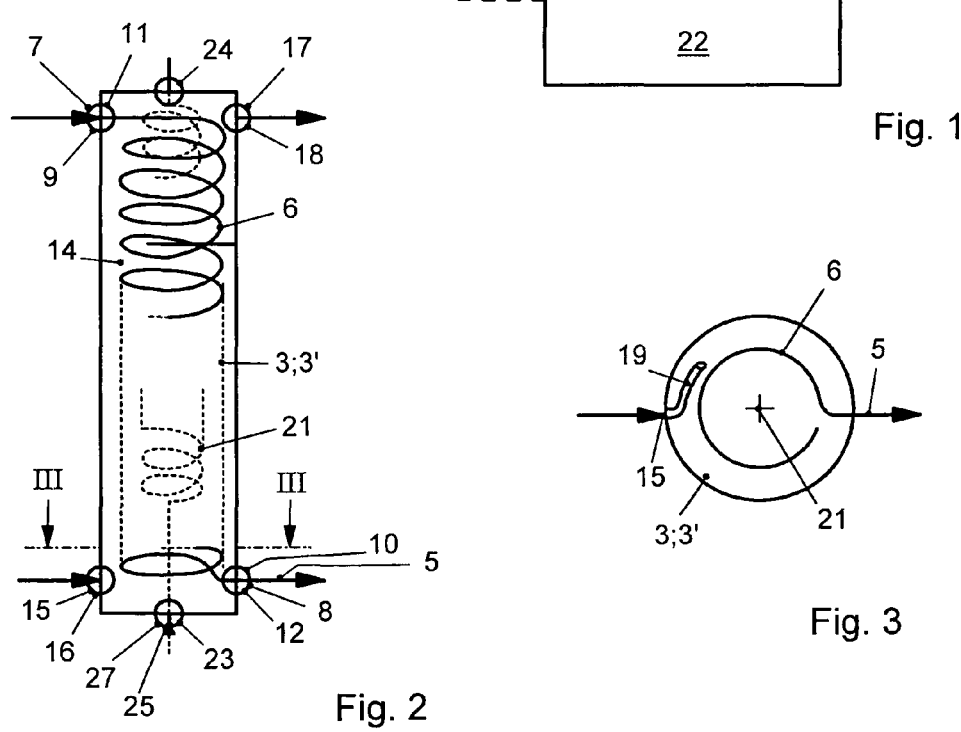
Fig. 1
Fig. 2
Fig. 3

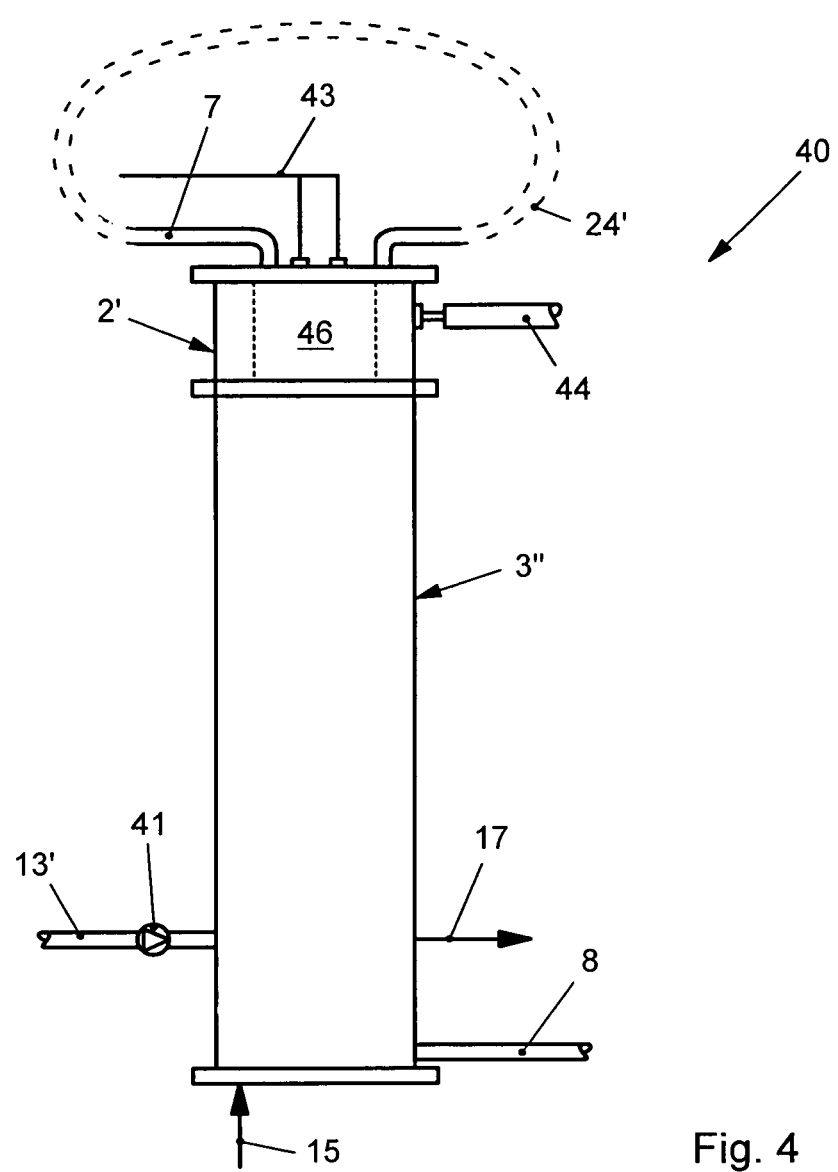
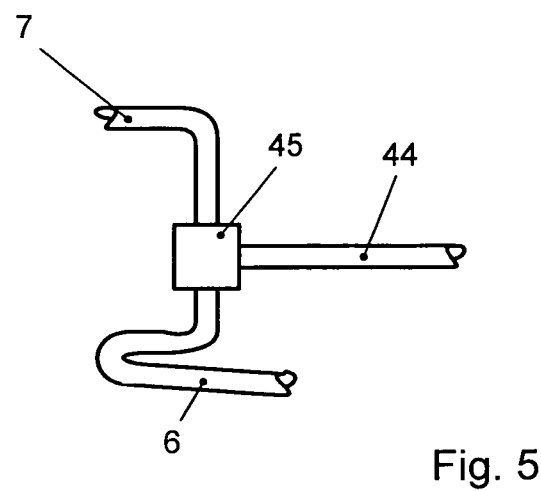
Fig. 4
Fig. 5

SYSTEM FOR PASTEURIZING ANIMAL FOOD

BACKGROUND OF THE INVENTION

The invention relates to a pasteurizing system for pasteurizing animal food having a pasteurizing unit and a cooling unit.

In order to free animal food, in particular milk, from pathogenic germs, it is known to pasteurize it or treat it with germ-destroying agents. In particular, the pasteurization of milk for animal feeding is known by freeing the milk from germs, bacteria, viruses etc. by pasteurization.

In pasteurizing systems for liquid animal food milk, e.g., is generally made aseptic by heating and subsequent cooling. In particular for calves, it is of importance in the initial weeks that they are fed with colostrum, since this contains the most substances for building up defense powers, but it can also be polluted with germs. In order then to protect the young animals against possible pathogens, bacteria, fungi etc., in particular, the colostrum is also pasteurized before it is administered as an animal nutrient.

A problem with the known pasteurizing systems is not the actual pasteurizing unit as such, but the heating and cooling times of the liquid animal food which is still heated, however, during the pasteurizing up to 90° C. The slower this process proceeds, the greater is the risk with milk that valuable milk components are destroyed at temperatures above 42° C. In addition, it is in any case very difficult to pasteurize colostrum since, in contrast to standard milk, it thickens at about 60° C. in a pudding-like manner and blocks the piping. Also, film-like deposits form on the heat-transfer surfaces, which deposits likewise lead to blockages.

In this context, EP 0 604 308 B2 discloses a heat exchange system for controlled cooling of freshly milked animal milk in which a heat exchanger is provided having two concentrically arranged circuits or lines between which the heat exchange takes place, more precisely in one line water for the cooling flows and in the other line the milk which is to be cooled flows.

However, proper pasteurizing systems are known from EP 1 494 960 B1, EP 1 610 618 B1 and EP 1 613 167.

The object of the present invention is to provide a practicable pasteurizing system for pasteurizing liquid animal-origin foods such as milk, and in particular colostrum, for aseptic animal feeding, in which, in particular, rapid gentle heating and cooling of the liquid food to the service temperature as animal food is ensured. Conversely, at the same time it should be possible using this system to gently preheat cooled liquid animal foods before they are pasteurized. In addition, suitable methods for operating the pasteurizing system are stated.

SUMMARY OF THE INVENTION

The foregoing object is achieved by the present invention wherein the cooling unit is constructed as a heat exchanger, the height extent of which is a multiple of its greatest cross sectional extent, in the interior of which a pipe is provided as a cooling serpentine which passes virtually completely through its height extent.

According to the invention it is expedient if the heat exchanger is constructed so as to have a cylindrical shape and the ratio of the height extent "H" of which to the diameter of the circular cross section "D" is 2:1 to 10:1, in particular 4:1, which favors a cooling section as long as possible and therefore acting in a gentle manner.

In order to achieve this it is provided according to the invention that the heat exchanger, in its interior, has a pipe in the form of a cooling serpentine, which passes through the height extent of said heat exchanger virtually completely. In this case it is expedient, in order to obtain a heat exchange surface as large as possible, that the cooling serpentine is constructed in the shape of a helical spring, wherein the cooling serpentine and is connected by its top end to a feed port and by its lower end to an outlet port, each of which is arranged on the heat exchanger.

It is advantageous when the feed port and the outlet port in each case has a control element such as a valve and a sensor for temperature measurement, wherein in this case the feed port of the cooling serpentine can be further conducted to the pasteurizing unit and the outlet port of the cooling serpentine can be further conducted to at least one animal trough unit, wherein the pasteurized milk is stored temporarily in a storage container, preferably cooled and optionally preserved.

A suitable heat exchange medium is particularly water which advantageously enters into the heat exchanger as cold water via a feed tap which is arranged in the bottom region of said heat exchanger and has a temperature sensor and exits again from this via an outlet tap which is provided in the ceiling region of the heat exchanger and has a temperature sensor. In order in this process to achieve a particularly good efficiency of the heat exchanger, it is advantageous when the feed tap provided in the bottom region of the heat exchanger has an inlet port such that the cold water flows into the heat exchanger tangentially. The water contents of the heat exchanger thereby receive a certain spin in order to accelerate the heat exchange between water and milk.

For generation of germ-free liquid animal-origin foods such as in the form of milk for animal feeding, the present invention is distinguished particularly by a method of operating the pasteurizing system according to the invention in that the liquid animal foods, such as milk, which are treated in the pasteurizing unit are introduced into the cooling serpentine of the heat exchanger at a temperature between 60° C. and 90° C., preferably 72° C., and are passed out of this at a temperature between 4° C. and 45° C., preferably 38° C.

In addition, in the method according to the invention, it is advantageous when the animal foods which are introduced into the cooling serpentine of the heat exchanger and are treated in the pasteurizing unit for germ destruction undergo a heat exchange with the water surrounding the cooling serpentine such that water entering into the bottom region of the heat exchanger via the feed tap in the bottom region of the heat exchanger at a temperature of about 4° C. to 20° C., preferably 15° C., or ice water of temperatures below 0° C. leaves the heat exchanger again via the outlet tap provided in the ceiling region at a temperature from 50° C. to 80° C., preferably above 65° C., which water can then advantageously be utilized or used in other ways as a by-product in the form of warm process water.

In the case of a pasteurizing system, the pasteurizing unit can be arranged separately from the heat exchanger and in another exemplary embodiment the pasteurizing unit is seated on the heat exchanger. This produces a very compact and space-saving unit.

In the pasteurizing unit the pasteurizing temperature can be generated by an immersion heater unit which heats the surrounding water. In addition, there is the possibility of feeding hot water which is removed again, however, still upstream of the heat exchanger. The pasteurization can also proceed, however, by means of steam fed to the milk. The feed proceeds preferably in a mixing chamber or in a mixing tube in which the steam is set rotating and/or is vortexed with the milk.

In a further exemplary embodiment of the invention, the heat exchanger, in addition to the cooling serpentine for liquid animal foods treated in the pasteurizing unit, optionally, can have a further cylindrical helical-spring-shaped preheating tubular serpentine for preheating liquid animal foods, in particular milk, originating in particular from a cooling tank. This preheating tubular serpentine can engage together with the cooling serpentine.

The total height is thereby added and the efficiency is therefore significantly increased.

For space reasons, it is advisable in this case to design the diameter of the preheating tubular serpentine to be smaller compared with the cooling serpentine and to arrange it within it. Expediently, the preheating tubular serpentine must be installed in such a manner that, in the bottom region of the heat exchanger it is connected to a feed port arranged there, and in the ceiling region thereof is connected to an outlet port which is provided there, wherein both the feed port and the outlet port can each be equipped with a shut-off element and a temperature sensor for better control. In this case the feed port is connected to the cooling tank for liquid animal-origin foods and the outlet port is connected to the pasteurizing unit.

In this variant also, the present invention is distinguished by a method of generating liquid animal-origin food, such as milk, for animal feeding from a cooling tank in that, particularly, in the pasteurizing system according to the invention, the liquid animal-origin food is introduced into the preheating tubular serpentine from the cooling tank at a temperature of about 6° C., in particular 4° C., from this it is then passed on preheated to about 60° C. to the pasteurizing unit and then after it is made aseptic in this is fed via the cooling serpentine to at least one drinking trough device in a ready-to-use state for the animals.

An improvement which must be emphasized in the temperature transfer in the cooling medium in both directions proceeds according to the invention in that the medium which is to be treated, for example milk, is conducted in pulses through a pipe coil of which the cooling serpentine and/or the preheating serpentine consists. By this means the pipe coil which floats in the cooling medium is set vibrating, as a result of which the heat transfer is accelerated and improved without the temperature layers in the medium being mixed and thereby destroyed. For this inventive concept, furthermore, protection is also sought for plants in which no pasteurization proceeds, but, e.g., only standard cooling or preheating.

The temperature control in the pasteurizing unit is achieved preferably via controlling a heating body or an immersion heater appliance, the control of a hot water feed and/or by controlling a steam feed using data from temperature sensors which are situated in the immersion region of the heating body, in the hot water feed region and/or in the region of the steam heating. For optimization, the output of pumps for the milk can be controlled via a process computer. The flow velocity and thereby the residence time in the heat exchanger or in the pasteurizing unit of milk which is to be pasteurized or cooled and/or of milk which is to be heated is controlled by modifying the output of milk-transporting pumps.

Finally, it is expedient for simple handling of the pasteurizing plant according to the invention that all of the temperature sensors, firstly, and all of the metering elements, secondly, are connected to a computer unit by means of which the control of all of the process sequences, also the cleaning, can be effected manually or automatically, wherein the pasteurizing system according to the invention can be installed not only so as to be stationary, but also so as to be mobile.

BRIEF DESCRIPTION OF THE DRAWINGS

Further advantages and features of the present invention will become manifest from the accompanying description of preferred exemplary embodiments and also with reference to the drawing; in the drawing FIG. 1 shows as a plan a pasteurizing system which has a heat exchanger having a cooling serpentine, wherein a second solution is shown dashed at the same time, in which in addition, a further preheating tubular serpentine is provided in the heat exchanger;

FIG. 2 shows a section through the heat exchanger along line II-II in FIG. 1;

FIG. 3 shows a section through the heat exchanger along line III-III in FIG. 2;

FIG. 4 shows a side view of a further embodiment of a pasteurizing system;

FIG. 5 shows a side view of parts of the pasteurizing system according to FIG. 4.

DETAILED DESCRIPTION

FIG. 1 shows diagrammatically a pasteurizing system— denoted by 1—which essentially comprises a pasteurizing unit 2 and a heat exchanger 3 and 3'. In addition, an animal drinking trough device 4 is connected to the pasteurizing system 1 via a line 5.

The heat exchanger 3 and 3' is constructed so as to be cylindrical and has a height extent "H", and its circular cross section has a diameter "D", wherein the ratio of H:D in this exemplary embodiment is 4:1 which gives a relatively long cooling section and thus ensures an even and gentle cooling without losses in quality.

As can be seen in FIG. 2, the heat exchanger 3, as a first exemplary embodiment, has in its interior a pipe in the form of a cooling serpentine 6 which is constructed in the shape of a helical spring and passes virtually completely through the height extent "H" of the heat exchanger 3. The cooling serpentine 6 itself is connected by its top end to a feed port 7 and by its bottom end to an outlet port 8, each of which are arranged on the heat exchanger 3. Not only the feed port 7 but also the outlet port 8 each has a valve 9 or 10, respectively, as control element and a sensor 11 or 12, respectively, for temperature measurements.

The feed port 7 of the cooling serpentine 6 is connected to a feed line 13 coming from the pasteurizing unit 2 and the outlet port 8 of the cooling serpentine 6 is connected via the line 5 to the drinking trough device 4.

The cooling serpentine 6 is surrounded by water 14 which enters as cold water into the bottom region of the heat exchanger 3 via a feed tap 15 arranged in the bottom region of the heat exchanger 3 having a temperature sensor 16 and exits again from the ceiling region of the heat exchanger 3 as heated water via an outlet tap 17 provided in the ceiling region of the heat exchanger 3 having a temperature sensor 18.

A peculiarity of the feed tap 15 is shown in FIG. 3, and more precisely this feed tap has in the interior of the heat exchanger 3 and 3' an inlet port 19 running tangentially, in such a manner that cold water 14 flows tangentially into the heat exchanger 3 and thereby an improvement of the heat transfer between water and milk can proceed.

The method of generating pasteurized milk for animal feeding proceeds, for the example of milk, using the pasteurizing system 1 as follows:

Via a feed line 20, milk passes into the pasteurizing unit 2 and is there pasteurized in a known manner by heating and then passes at a temperature of 72° C. via the feed line 13 to the feed port 7 of the cooling serpentine 6, passes through this and exits again from the heat exchanger 3 at the outlet port 8 of the cooling serpentine 6 at a reduced temperature of below 45° C., and preferably of about 38° C. to 42° C. and then passes via the line 5 into the drinking trough device 4 where the young animals can drink this liquid animal food. The milk can also be preserved and temporarily stored in a storage container.

In order to obtain this cooling of the milk, relatively cold water of approximately 15° C. is fed simultaneously to the heat exchanger 3 via the feed tap 15, more precisely via the tangential inlet port 19 which then, after the heat exchange with the milk flowing in the cooling serpentine 6 leaves the heat exchanger 3 again via the outlet tap 17 at a median temperature of about 65° C. This heated water 14 can then preferably be further used as process water, for example for rinsing and cleaning.

The second exemplary embodiment included in FIGS. 1 and 2 provides that a heat exchanger 3', in addition to the cooling serpentine 6, further has a preheating tubular serpentine 21 which, as is the cooling serpentine 6, is likewise constructed so as to be cylindrical and helical-spring-shaped. This preheating tubular serpentine 21 can be used for preheating liquid animal foods, in particular milk, originating from a cooling tank 22. In this manner heat recovery from the milk cooling is also ensured. The preheating tubular serpentine 21 possesses therefor a diameter which is smaller compared with the cooling serpentine 6 such that it can be arranged inside the cooling serpentine 6. In a preferred exemplary embodiment, however, the helix of the preheating tubular serpentine 21 has the same diameter as the helix of the cooling serpentine 6 and both serpentines are conducted in one another.

The preheating tubular serpentine 21 has in turn, in the bottom region of the heat exchanger 3', a connection via a feed port 23 and, in the ceiling region thereof, an outlet port 24, wherein not only the feed port but also the outlet port 23 and 24, respectively, are in each case equipped with a shut-off element in the form of a valve 25 or 26, respectively, and a temperature sensor 27 or 28, respectively. The feed port 23 is connected to the cooling tank 22 via a pipe 29 and the outlet port 24 is connected via a pipe 30 to the feed line 20 of the pasteurizing unit 2.

In the event that, instead of fresh milk, such is taken from the cooling tank 22 for preparation as ready-to-use animal food, the method therefor proceeds as follows:

First the cooled milk from the cooling tank 22 at a temperature of 4° C. is fed to the preheating tubular serpentine 21 via the pipe 29 and, while it flows through the preheating tubular serpentine 21 it is preheated to 50° C. Then, the preheated milk is passed on via the pipe 30 to the feed line 20 from which it is then fed via a control valve 31 having a temperature sensor 32 to the pasteurizing unit 2 to be made germ-free, in order then finally to pass through the cooling serpentine 6 again as in the first exemplary embodiment.

In the feed line 20 and/or in the feed line 13 or at another suitable point, in addition, connection ports 33 or 34 are provided via which, as required, and optionally, other substances such as non-marketable milk, germ-destroying agents, medicaments, feed additives and the like can be fed.

Finally, all of the temperature sensors 11, 12, 16, 18, 27, 28 and 32, and all of the metering elements 9, 10, 15, 17, 25, 26 and 31 can be connected to a computer unit which is not shown, by means of which then the individual sequences of the entire pasteurizing system 1 which can be installed so as to be stationary or mobile can be automatically controlled in a closed-loop or open-loop manner.

Overall, the present invention provides an economically operating pasteurizing system for pasteurizing liquid or liquefied foods from animals, such as milk, for animal feeding, which can be used in a quality-protecting and flexible manner, more precisely not only for generating ready-to-consume animal food from, e.g. raw milk, but also from, e.g. cooled milk, wherein the addition of further substances, such as medicaments and the like, is likewise possible in a simple manner.

Colder water in the lower region does not thereby mix with hot water in the upper region, and so an optimized heat exchange for pasteurization and subsequent cooling remains ensured. This is likewise in the context of the present invention.

In addition, it is preferably intended that the tube coil of cooling and/or preheating serpentine 6, 21 consists of sprung material and is arranged floating in the cooling medium. The food is forced in pulses through the tube coil using corresponding appliances, in particular pumps. This sets the tube coil in short vibrating motions in the cooling medium. These vibrating motions significantly accelerate and improve the heat transfer in the cooling medium in both directions, without in this process the temperature layers in the water being mixed from top to bottom and thereby destroyed.

In a further exemplary embodiment of a pasteurizing system 40 according to FIG. 4 a pasteurizing unit 2' is mounted directly on a heat exchanger 3". A feed line 13' for milk, in particular for colostrum, opens into the heat exchanger 3", which milk is then, in a serpentine which is not shown in more detail, conducted through the heat exchanger 3" and the pasteurizing unit 2' to an outlet port 24' and is preheated in the process. A pump 41 is further connected into the feed line 13'. In addition, the feed line 13' is situated at a height at which the milk which is introduced into the heat exchanger 3" does not come into contact, or only comes into contact slightly with the feed tap indicated by the arrow 15 for a cold medium. An outlet tap 17 for the cold medium is likewise situated approximately at the height of the feed line 13', and thereby no short circuit can be formed between cold cooling medium and already heated cooling medium.

In the region of the pasteurizing unit 2' an immersion heater appliance 43 is used, using which the water can be brought to pasteurization temperature in the region of the pasteurizing unit 2'.

Instead of the immersion heater appliance 43 or in addition thereto, hot steam can further be added to the milk in the feed port 7. Said steam is introduced via a feed line 44 into the pasteurizing unit 2' and passes, as can be seen in FIG. 5, in a mixing chamber 45 into the feed port 7 and is there mixed with the milk, wherein the temperature of the milk is increased to pasteurization temperature. Preferably, in this case, the steam is set in circular motion in the mixing chamber 45 which can be achieved by appropriate internals. The steam is distributed rapidly and uniformly with the milk. By this means, no heat-transfer surfaces are formed and therefore no deposits, in particular fouling. In particular in the case of colostrum and other liquid foods forming deposits, the steam prevents the clumping of the colostrum or of the other liquid foods in the upper temperature range. Furthermore, the steam supply promotes and facilitates the cleaning and sterilizing of all milk-bearing elements in the system.

The mixing chamber 45 is preferably kept as small as possible in order to avoid dead spaces and thus deposits. In addition, not only the mixing chamber 45 but also a hot-holding tube 46 in the interior are preferably provided with heat-insulating material, in order to avoid hot surfaces due to steam or the like. This material is preferably Teflon. However any other material having this property is also conceivable.

The mixing chamber can, moreover, also be provided outside the pasteurizing unit in the feed port 7.

The hot-holding tube 46 is constructed in the pasteurizing unit 2' in which the milk is held at a temperature of approximately 72° C. for 15 to 30 sec. The hot-holding tube can also be arranged outside and can consist of a tube ring in order to optimize the mechanical cleaning. The tube ring is preferably enclosed with foamed material which prevents heat loss to the outside.

Downstream of the hot-holding tube 46, the milk is cooled again in the heat exchanger 3" and passed out through an outlet port 8. This heat which is taken up by the cooling of cooling medium is used for heating the milk which is to be preheated.

The mode of functioning of this exemplary embodiment is as follows:

The colostrum which is to be treated is introduced via the feed line 13' into the pasteurizing unit 2' by means of the pump 41. The through-flow velocity and thereby the exit velocity are controlled in this process via the pump output, as a result of which, in turn, the temperature of the preheated milk is precontrolled at the outlet port 24 and of the cooled milk at the outlet port 8. In this manner, for example the preheated milk can be kept below the critical limit of 60° C. for temperature-sensitive products, in particular colostrum, for steam pasteurization.

The milk is brought to pasteurization temperature in the pasteurizing unit 2' by the water which is heated by means of the immersion heater appliance 43 and/or by the steam which is introduced via the feed line into the mixing chamber 45. Thereafter the milk in the cooling serpentine is conducted through the heat exchanger 3" downward to the outlet port 8 and in this process cooled in a layered manner.

In these pasteurizing systems according to the invention, primarily the very effective energy budget must be emphasized. Virtually 75% of the energy which is input into the system is recovered via the guidance according to the invention of pasteurized milk and milk which is to be cooled and the supply of fresh milk which is to be heated.

Furthermore, these pasteurizing systems according to the invention are designed for operation and cleaning as continuous-flow systems.

The invention claimed is:

1. A pasteurizing system for pasteurizing animal food comprising a pasteurizing unit, a cooling unit constructed as a heat exchanger, a height extent of the cooling unit is a multiple of a cross sectional extent of the cooling unit, a ratio of the height extent to a diameter of the cross sectional extent is between 2:1 and 10:1, an interior cooling serpentine is provided in the cooling unit and passes downward virtually completely through the height extent of the cooling unit, wherein the cooling serpentine is constructed in the shape of a helical spring having a top end and a lower end and is connected at the top end to a feed port for connection to the pasteurizing unit and at the lower end to an outlet port for connection to a feed trough, wherein the feed port is proximate to the top of the heat exchanger, and the outlet port is proximate to a bottom region of the heat exchanger, the cooling serpentine is surrounded by water which enters into the heat exchanger via a feed tap which is arranged in the bottom region of said heat exchanger and has a temperature sensor and exits via an outlet tap which is provided in a ceiling region of the heat exchanger and has a temperature sensor, and the feed tap which is provided in the bottom region of the heat exchanger has an inlet port such that the cold water flows into the heat exchanger tangentially.

2. The pasteurizing system as claimed in claim 1, wherein the heat exchanger is constructed so as to have a cylindrical shape.

3. The pasteurizing system as claimed in claim 2, wherein the ratio of the height extent to the diameter of its circular cross section is 4:1.

4. The pasteurizing system as claimed in claim 2, wherein each of the feed port and the outlet port has a control valve and a sensor for temperature measurement.

5. The pasteurizing system as claimed in claim 2, wherein the outlet port of the cooling serpentine is connected to a storage container for the feed trough.

6. The pasteurizing system as claimed in claim 1, wherein the heat exchanger, in addition to the cooling serpentine for liquid animal foods treated in the pasteurizing unit has a further, preferably cylindrical, helical-spring-shaped preheating tubular serpentine for preheating liquid animal foods originating, in particular, from a cooling tank.

7. The pasteurizing system as claimed in claim 6, wherein the preheating tubular serpentine, with respect to the cooling serpentine, is arranged within, between or next to the cooling serpentine, wherein optionally, within the heat exchanger, guide elements for maintaining a temperature layering are arranged over the height.

8. The pasteurizing system as claimed in claim 7, wherein the preheating tubular serpentine is connected in the bottom region of the heat exchanger to a feed port and in the ceiling region of the heat exchanger to an outlet port, wherein both the feed port and the outlet port are each equipped with a shut-off element and a temperature sensor.

9. The pasteurizing system as claimed in claim 8, wherein the feed port is connected to a cooling tank for liquid animal-origin foods and the outlet port is connected to the pasteurizing unit.

10. The pasteurizing system as claimed in claim 8, wherein all of the temperature sensors, firstly, and all of the metering elements, secondly, are connected to a computer unit.

11. The pasteurizing system as claimed in claim 10, wherein it is controllable manually or automatically via the computer unit.

12. The pasteurizing system as claimed in claim 1, wherein the pasteurizing unit is seated on the heat exchanger.

13. The pasteurizing system as claimed in claim 12, wherein an immersion heater unit is assigned to the pasteurizing unit.

* * * * *